Feb. 5, 1929.

A. E. FLOWERS

APPARATUS FOR CONTINUOUSLY TREATING LIQUIDS

Filed June 22, 1926     3 Sheets-Sheet 1

1,701,068

WITNESS:

INVENTOR
Alan E. Flowers
BY
Busser and Harding
ATTORNEYS.

Feb. 5, 1929.                                                           1,701,068
A. E. FLOWERS
APPARATUS FOR CONTINUOUSLY TREATING LIQUIDS
Filed June 22, 1926         3 Sheets-Sheet 2

WITNESS:

INVENTOR
Alan E. Flowers
BY
ATTORNEYS.

Feb. 5, 1929.  A. E. FLOWERS  1,701,068
APPARATUS FOR CONTINUOUSLY TREATING LIQUIDS
Filed June 22, 1926    3 Sheets-Sheet 3

INVENTOR
Alan E. Flowers
BY
Busser and Harding
ATTORNEYS.

WITNESS:
Robt. R. Mitchel.

Patented Feb. 5, 1929.

UNITED STATES PATENT OFFICE.

1,701,068

ALAN E. FLOWERS, OF POUGHKEEPSIE, NEW YORK, ASSIGNOR TO THE DE LAVAL SEPARATOR COMPANY, OF NEW YORK, N. Y., A CORPORATION OF NEW JERSEY.

APPARATUS FOR CONTINUOUSLY TREATING LIQUIDS.

Application filed June 22, 1926. Serial No. 117,685.

Industrial and other processes frequently involve chemical or adsorption reactions, leaching, etc., which necessitate intimate contact between a liquid and a solid which is at most only slightly soluble in the liquid, or between two liquids of only slight miscibility. In many cases a given amount of the solid or second liquid may be used to react with (or treat) a relatively large volume of the first liquid, and in such cases it may be more desirable to cause a stream of the first liquid to flow through a small body of the powdered solid or of the second liquid, successively mixing the two together, separating out the treating agent, and returning the latter to the main body for re-use, while the flow of the first liquid is continuously maintained. Cases of this type are encountered, for instance, in the dry cleaning industry, where a continuous flow of solvent from the washer through a tank containing an alkaline solution and back to the washer is established to permit the partial or complete removal from the solvent of suspended or dissolved impurities. Similar or superior results may be obtained by substituting for the alkaline solution, or supplementing the alkaline solution by, a suitable adsorbing agent, for instance, an activated carbon or fuller's earth.

The object of the present invention is to provide a compact, flexible, inexpensive and simple device for carrying out the type of reaction described above. In order to make clear the principles of construction and operation used, three embodiments of the invention are shown and described.

Fig. 1 is a vertical sectional view of a preferred form of continuous decanter element, which, in conjunction with a suitable standard mixing element, storage element, pumping elements, and piping, will constitute a device by means of which a liquid stream may be continuously exposed to the action of a liquid treating agent, or, with slight modifications, to the action of either a liquid or a solid or of both together.

Figure 1:
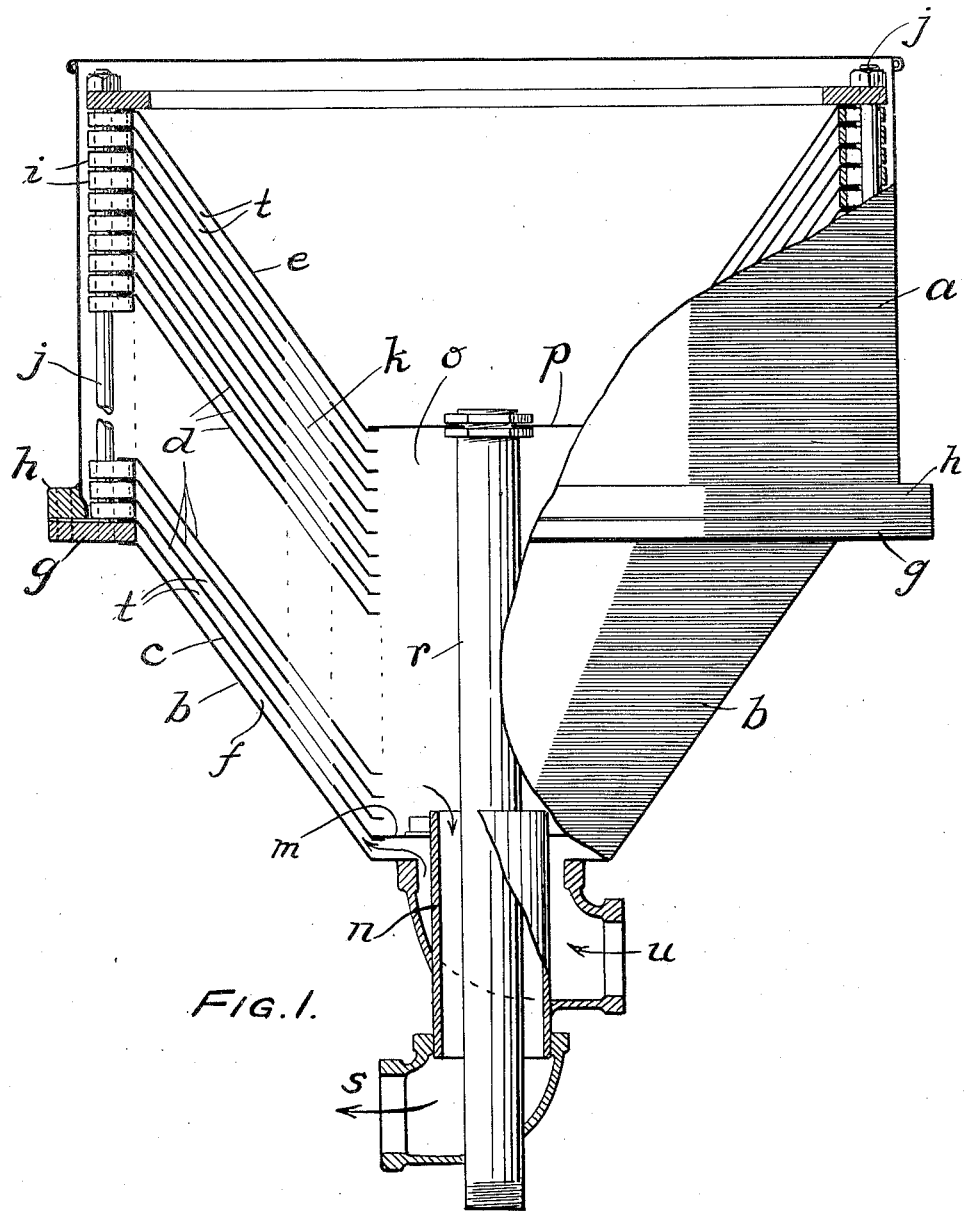

In Fig. 1 the main body of the decanter comprises, exteriorly, a cylindrical shell $a$ and a frustro-conical shell $b$. Arranged concentrically above shell $b$, within the main body of the decanter, and spaced apart, in a number of shells similar to shell $b$. These shells are hereinafter called "discs" in accordance with the nomenclature applied to similarly shaped frustro-conical plates in a centrifugal separator. The disc immediately above shell or disc $b$ is lettered $c$. The top disc is lettered $e$. The remaining discs are lettered $d$.

The space between the lower disc $b$ and the next disc $c$ above it forms a distributing chamber $f$. The joint between the upper ends of the two discs $b$ and $c$ is made by a ring $g$. A ring $h$ carries the shell $a$ and is connected with the ring $g$ by means of suitable bolts and gaskets.

The concentric spaces between the discs above disc $c$ form settling chambers $t$. The discs are stacked one above another, the vertical spacing between the discs being determined by suitable spacer rings $i$ strung on rods $j$, which also hold the stack of discs in alignment.

The distribution of the mixture among the settling spaces is obtained by providing in the conical disc $c$ and in all the intermediate discs $d$ several small holes, similarly located in each disc, so that when the discs are properly stacked there exist several continuous vertical passages $k$ through the stack, the number being the same as the number of holes in each disc. These passages terminate below the top disc $e$, which is not perforated. Because the intermediate discs $d$ are frustrums, there is a cylindrical central vertical passage through the stack of discs. This passage $o$ is closed at its lower end by a plate $m$, which is jointed to the disc $c$ and attached by a nut and gasket to a pipe $n$. The passage $o$ is closed at its upper end by a plate $p$ attached to the top disc and to the upper end of a pipe $r$.

Communicating with the distributor chamber $f$ between discs $b$ and $c$ is an inlet $u$ for the mixture of liquids to be decanted. Pipe $r$ affords an outlet for the separated liquid of lower specific gravity. Pipe n, leading to an outlet s, affords an escape for the liquid of higher specific gravity.

In operation, the mixture of the two liquids is caused to flow from the mixer through inlet u into the distributor chamber f between discs b and c. Thence the mixture flows upwards through the distributing passages k in the disc stack. By proper proportioning of the various elements, the mixture may be caused to distribute itself with satisfactory uniformity among the settling chambers t between the discs d, d, etc. In these settling chambers, the heavier components of the mixture settle to the lower surface of each chamber and slide down into the central cylindrical vertical passage o and thence pass through pipe n to outlet s, while the lighter component rises along the upper surfaces of the settling chambers, and finally collects in the annular space between the outer edges of the discs d and the outer shell a and overflows over the edge of the disc e and thence out through pipe r. If the heavier component escaping through pipe n is the treating agent, it is piped back to the mixing chamber for re-use.

It should be understood that the effluent pipe r may not be entirely free from the heavier component, and that the effluent from pipe n may not be entirely free from the lighter component, although by suitable choice of proportions and operating conditions, a nearly perfect separation may be closely approached.

Figure 2:
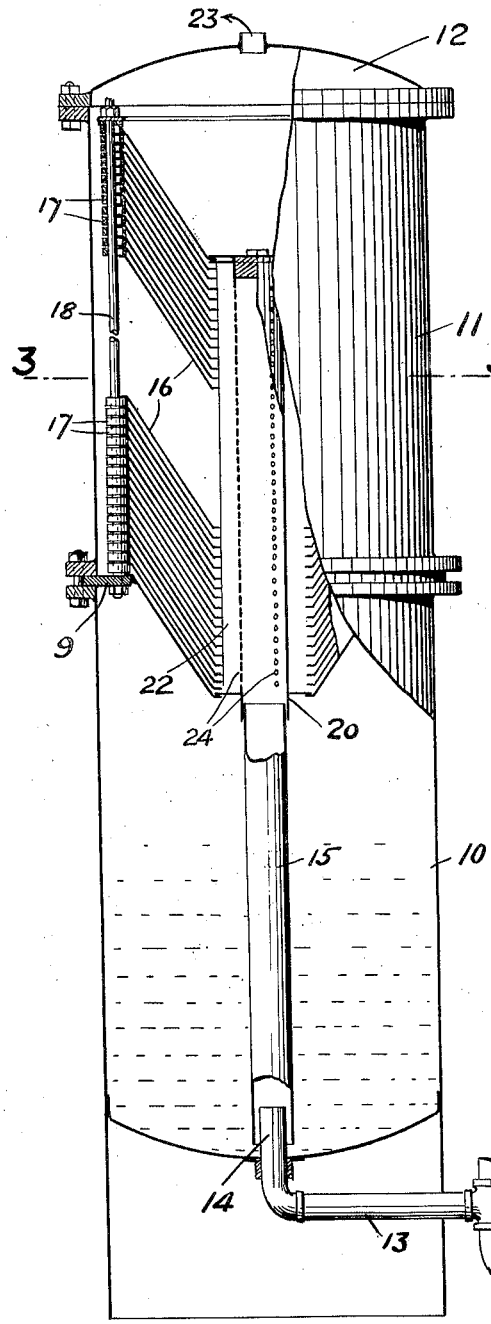
Fig. 2 is a vertical sectional view of a preferred construction of a self-contained continuous treater for bringing about reactions between liquids of slight miscibility.
Figure 3:
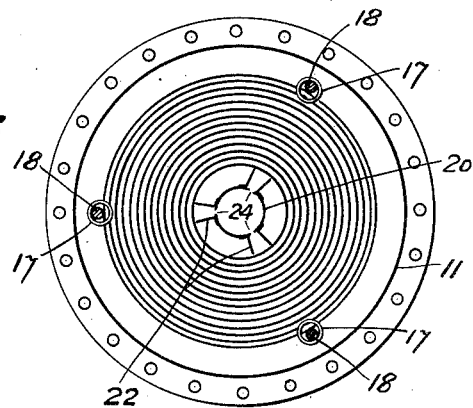
Fig. 3 is a cross-section through the treater of Fig. 2.

In Fig. 2 the body of the treater tank comprises a lower cylindrical shell 10, an upper cylindrical shell 11 and a cover 12. Pipe connections (not shown) may be provided in the part of the tank enclosed by shell 10 for continuous or intermittent renewal of the treating agent, which is stored in the lower part of the treater and is assumed to be heavier than the liquid to be treated. The latter enters the tank through pipes 13 and 14. Pipe 14 projects a short distance into the open lower end of a pipe 15 of larger diameter, which extends up through the center of shell 10.

In the portion of the tank enclosed by shell 11 is located a stack of discs 16 separated from one another by spacers 17 and held in alignment by rods 18. All of these discs 16 except the lowest one terminate at such a diameter that they can slide down between rods 18. The lowest disc is sealed to a ring 9 which is held between flanges on shell parts 10 and 11. As all the discs except the top one are frustrums, there is left a central vertical cylindrical extension of the storage compartment up through the disc stack. The top disc is sealed off, closing the upper end of this storage compartment extension. Pipe 15 joins the distributor pipe 20, which is sealed and supported by the top disc. In the distributor pipe 20 three vertical rows of holes 24 are drilled, and at each side of each row of holes a vertical guide vane 22 is provided, so that liquid leaving the perforations of pipe 20 may enter the settling chambers only in the zones between these vanes.

In operating the device shown in Fig. 2, the storage compartment within shell 10 is first filled to about half its capacity with the treating liquid. The stream of liquid to be treated is then caused to flow into pipe 13. After the tank has filled and begins to overflow at 23 (in cover 12), the liquid leaving pipe 14 mixes with treating liquid in pipe 15. Pipes 15 and 20 become filled with a mixture of the liquid of the stream and the treating liquid, of such a composition that the weight of this column, plus the pressure required to overcome the fluid friction in the pipes, distributing orifices, etc., counterbalances the weight of the corresponding external column of liquid stream and treating liquid, the operation being similar to the well known air-lift in principle. The mixture enters the settling chambers in the spaces between discs 16 through the holes 24 in the distributor pipe. In the settling chambers, part or all of the treating liquid settles out as the liquid stream flows upward and outward, and upon reaching the lower ends of the chambers, slides downwards and finally drops off the inner edges of the discs 16 and back into the storage compartment in shell 10, carrying with it part or all of any reaction products formed. The liquid stream, partly or completely free from treating liquid, flows upwards into the annular space around the outer edges of the discs 16 and thence into the space above the top disc and finally out through pipe 23.

Figure 4:
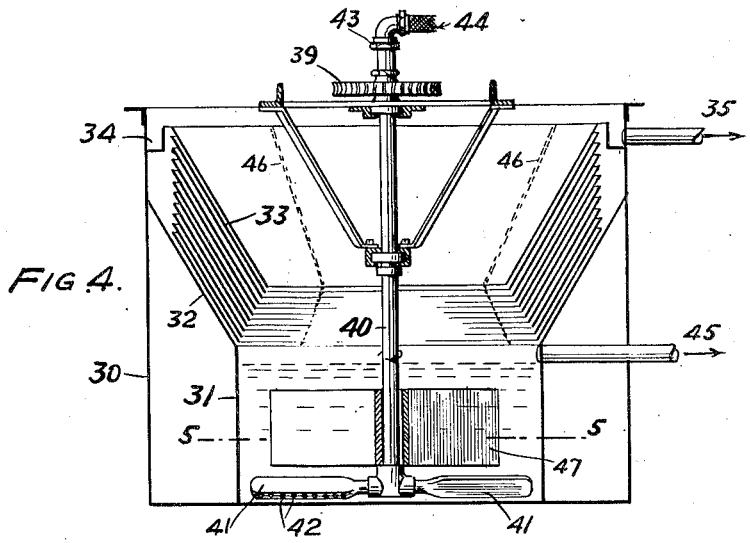
Fig. 4 is a vertical section through a preferred construction of a self-contained continuous treater unit suitable for bringing about reactions between a liquid and a solid or between two liquids.
Figure 5:
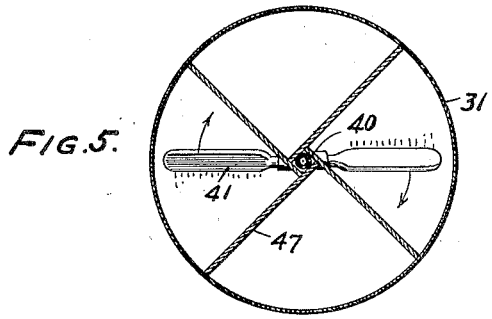
Fig. 5 is a section on the line 5—5 of Fig. 4.

In Fig. 4, a tank 30 is provided with an inner shell 31, whose funnel-shaped upper part 32 is at its top joined to the upper portion of the tank wall and forms, in effect, the lowest disc of a stack of discs 33. Above the junction of disc 32 with the tank wall, is an annular trough 34, to which is connected an outlet pipe 35. The stack of discs 33 is so assembled that a uniform spacing between discs is maintained. The centers of the discs are preferably cut out in such a way that the inner edge of each disc except the lower one somewhat overhangs the disc below it.

In the center of the tank and extending nearly to the bottom is a hollow vertical shaft 40, which may be rotated by means of a suitably driven worm wheel 39. To the lower end of shaft 40 are attached hollow agitator arms 41, on the trailing side of which are a number of perforations 42. The upper end of shaft 40 is connected through a gland 43 to the inlet 44 for the liquid stream to be treated.

A pipe 45 is provided for draining the tank before renewing the charge of treating agent; it being understood, however, that any suitable means may be used for effecting either continuous or intermittent renewal. Separators 46 on discs 33 in the upper part of the tank prevent swirling and baffles 47 may be attached to shell 31 for the same purpose.

In operating the device shown in Fig. 4, the storage compartment enclosed by the cylindrical part of shell 31 is first filled with the treating agent, which may be either a liquid, a solid, or a mixture of both. Rotation of the agitator arms 41 is then started, and the liquid stream is fed in through inlet 44, being liberated at the lower part of the storage compartment through the perforations 42 on the rotating agitator arms 41. The liquid stream, carrying with it some of the treating agent, enters the settling chambers between the discs. The liquid finally overflows into the trough 34 and thence flows out of the pipe 35. Part or all of the treating agent settles out in the settling chambers between the discs, slides down the disc surfaces, and drops off the inner edges of the discs back into the storage compartment within shell 31.

Figure 6:
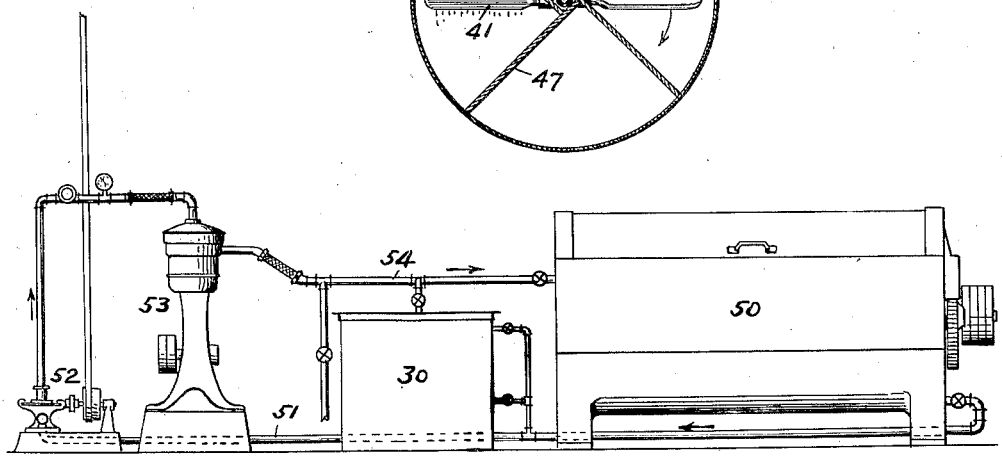
Fig. 6 is a side elevation of a complete apparatus of which the treater unit of Fig. 4 is a part.

Fig. 6 shows a dry cleaning apparatus adapted to receive one of the treating tanks, preferably that shown in Fig. 4. From the washer 50 extends a pipe 51 (in which is interposed a pump 52) to a centrifugal clarifier 53. From the clarifier extends a pipe 54 back to the washer. The treater tank 30 is placed in a by-pass between pipes 51 and 54.

The three treating devices illustrated in the drawings and hereinbefore described are designed particularly for treating liquid streams with treating agents of higher density than the liquid involved, and for partially or completely separating the treating agent from the liquid stream by gravity. These are the conditions which would obtain in by far the largest part of the practical applications of this invention. Either the device shown in Fig. 1 or that shown in Fig. 2 might, however, be used for treating a stream of heavy liquid with a lighter one, by simply inverting the apparatus. An example of a possible application of this type would be the extraction of tin chloride from solution in carbon tetrachloride by the use of water or dilute acid or alkali solution as a treating agent. Such solutions of tin chloride in carbon tetrachloride are obtained in certain processes for de-tinning.

While for simplicity in the above description I have mentioned only gravity as the separating force, the invention is operative where other forces are relied upon to cause movement of one material relative to another, such as a magnetic force or an electrostatic force. In the claims, therefore, the term "field of separating force" is intended to include all fields of force which tend to cause movement of one material relative to another. It will, however, be understood that it is not intended to include centrifugal force, whose operation is dependent on the rotation, at a high speed, of elements that are intended to facilitate the operation of the force.

For the discs may be substituted any devices which divide the mixture into relatively thin layers extending at an angle to the lines of force less than the angle of repose of either component of the mixture.

Where, in the claims, reference is made to the separation of the liquid from its treating agent and reaction products, it will be understood that it is intended to comprehend constructions wherein the separation is imperfect, that is, wherein the separated liquid carries off some of the treating agent or more or less of the reaction product or both and wherein the other component may, in addition to the treating agent, comprise some or all of the reaction product and more or less of the liquid.

Where in the specification reference is made to "lines of force" and "angle of repose", it should be understood that, for example, where gravity is the force operative in the process, the "lines of force" will be vertical, and that where accumulating fine solids form themselves into a pile, which naturally assumes the form of a cone, the "angle of repose" to the lines of force is that angle to the vertical which the side of the cone assumes. A disc arranged at an angle to the lines of force less than the angle of repose is, therefore, so disposed as to cause solids fed thereto to slide down its surface and fall off its edge.

Having now fully described my invention, what I claim and desire to protect by Letters Patent is:

1. In an apparatus for causing action between a fluid and another material, means wherein the fluid is adapted to continuously flow and mix with the other material, means to promote separation comprising, within a field of separating force, devices adapted to divide the mixture into thin layers at an angle to the lines of force substantially less than the angle of repose of either material, means adapted to distribute the mixture in multiple substantially equally to the several thin layers, and means to return one separated material to the locus of mixing and to discharge the other material.

2. In an apparatus for mixing a liquid and a treating agent and for effecting a subsequent separation from the liquid of the treating agent and reaction products, the combination with a pile of settling chambers open at opposite ends and having inclined walls, of a container for the treating agent, means, communicating with the container and with the settling chambers, through which the mixture is adapted to flow to the settling chambers and be distributed thereamong, corresponding open ends of the settling chambers communicating in multiple with the container, and means providing an outflow passage communicating with the opposite corresponding open ends of the settling chamber.

3. In an apparatus for mixing a liquid and a treating agent and for effecting a subsequent separation from the liquid of the treating agent and reaction products, the combination with a container for the treating agent having an inlet for admission of liquid to be treated, of a set of settling chambers having inclined walls and open at opposite ends, corresponding open ends of the settling chambers communicating in multiple with said container, and means providing an outflow passage communicating with the opposite corresponding open ends of the settling chambers.

4. In an apparatus for continuously exposing a liquid stream to the action of a treating agent of different density from, and relatively insoluble in, the liquid of said stream, means wherein the liquid of the stream and the treating agent may be mixed, a plurality of settling chambers among which the mixture of liquid and treating agent is adapted to be distributed, the surfaces of the settling chambers being so arranged and inclined that a substantial part of the treating agent, with any reaction products that may be formed and carried off therewith, may, after a substantial separation from the liquid, slide along and beyond said surface or surfaces, one or more collecting compartments adapted to receive such separated component, means for removing such separated component from said collecting compartment or compartments to the locus of mixing, and means for allowing egress from said settling chambers of the remainder of said liquid stream together with any part of the treating agent and reaction products that may not have separated from the liquid.

5. In an apparatus for continuously exposing a liquid stream to the action of a treating agent of different density from, and relatively insoluble in, the liquid of said stream, a storage compartment adapted to hold said treating agent, the treating agent being adapted to be continuously withdrawn from said storage compartment and mixed with the liquid of said stream, a plurality of settling chambers, among which the mixture of liquid and treating agent is adapted to be distributed, the surfaces of the settling chambers being so inclined and arranged that a substantial part of the treating agent, with any reaction products that may be formed and carried off therewith, may, after substantial separation from the liquid of the stream, slide along said surface or surfaces into said storage compartment, and means permitting egress from said settling chambers of said liquid stream together with any part of the treating agent and reaction products that may not have separated from the liquid.

6. In an apparatus for continuously exposing a liquid stream to the action of a treating agent of different density from, and relatively insoluble in, the liquid of said stream, a storage compartment adapted to hold said treating agent and receive the liquid stream, an agitator in said storage compartment, a plurality of settling chambers communicating with the storage compartment and among which the mixture of liquid and treating agent is adapted to be distributed, the surfaces of said settling chambers being so inclined and arranged that a substantial part of the treating agent with any reaction products that may be formed and carried off therewith may, after substantial separation from the liquid of the stream, slide along said surface or surfaces into said storage compartment, and means permitting egress from said settling chambers of said liquid stream together with any part of the treating agent and reaction products that may not have separated therefrom.

In testimony of which invention, I have hereunto set my hand, at Poughkeepsie, New York, on this third day of June, 1926.

ALAN E. FLOWERS.